(12) United States Patent
Berger et al.

(10) Patent No.: US 7,455,721 B2
(45) Date of Patent: Nov. 25, 2008

(54) DEVICE AND METHOD FOR HUMIDIFYING A GAS FLOW

(75) Inventors: Gerhard Berger, Ebersbach (DE); Jens Intorp, Ulm (DE); Gerhard Konrad, Ulm (DE); Arnold Lamm, Elchingen (DE); Sven Schnetzler, Marburg (DE)

(73) Assignee: Daimler AG, Stuttgart (DE)

( * ) Notice: Subject to any disclaimer, the term of this patent is extended or adjusted under 35 U.S.C. 154(b) by 489 days.

(21) Appl. No.: 10/521,515

(22) PCT Filed: Jul. 2, 2003

(86) PCT No.: PCT/DE03/02200

§ 371 (c)(1),
(2), (4) Date: Oct. 14, 2005

(87) PCT Pub. No.: WO2004/017450

PCT Pub. Date: Feb. 26, 2004

(65) Prior Publication Data

US 2006/0101994 A1    May 18, 2006

(30) Foreign Application Priority Data

Jul. 18, 2002   (DE) .................................. 102 35 757

(51) Int. Cl.
*B01D 53/22* (2006.01)
*H01M 8/04* (2006.01)

(52) U.S. Cl. .................. 96/4; 96/8; 96/10; 96/417; 95/52; 95/8; 95/10; 95/12; 429/20; 429/22; 429/26

(58) Field of Classification Search .................. 96/4, 96/7, 8, 10, 417; 95/45, 52, 8, 10, 12; 429/19, 429/20, 22, 26; 261/104, 107
See application file for complete search history.

(56) References Cited

U.S. PATENT DOCUMENTS

| 6,007,931 | A | 12/1999 | Fuller et al. .................. 429/13 |
| 6,048,383 | A | 4/2000 | Breault et al. .................. 95/44 |

(Continued)

FOREIGN PATENT DOCUMENTS

DE    198 12 960    11/1999

(Continued)

*Primary Examiner*—Jason M Greene
(74) *Attorney, Agent, or Firm*—Davidson, Davidson & Kappel, LLC

(57) ABSTRACT

An apparatus for humidifying a gas stream includes a humidifier device having at least one membrane permeable to water vapor. The gas stream and a humid gas stream flow through a humidifier device, being separated from one another by the at least one membrane. The apparatus includes at least one bypass line configured to route at least part of one of the gas stream and the humid gas stream so that it does not come into contact with the membrane. In addition a method for humidifying a gas stream, includes flowing the gas stream through a humidifier having a membrane permeable to water vapor, flowing a humid gas stream through the humidifier separated by the membrane, and routing at least a portion of one of the gas stream and the humid gas stream using a bypass line so that it does not come into contact with the membrane, and varying a quantity of the portion so as to set a predetermined dew point in the gas stream.

4 Claims, 3 Drawing Sheets

U.S. PATENT DOCUMENTS

| | | | |
|---|---|---|---|
| 6,656,620 B2* | 12/2003 | Katagiri et al. | 429/26 |
| 6,696,192 B2* | 2/2004 | Kanai et al. | 429/22 |
| 6,755,399 B2* | 6/2004 | Shimanuki et al. | 95/52 |
| 6,808,832 B2* | 10/2004 | Suzuki et al. | 429/22 |
| 6,872,484 B2* | 3/2005 | Katagiri et al. | 429/26 |
| 6,884,534 B2* | 4/2005 | Wheat et al. | 429/26 |
| 6,953,635 B2* | 10/2005 | Suzuki et al. | 429/22 |
| 2001/0010875 A1 | 8/2001 | Katagiri et al. | 429/22 |
| 2001/0015500 A1 | 8/2001 | Shimanuki et al. | 261/104 |
| 2002/0039674 A1 | 4/2002 | Suzuki et al. | 429/30 |
| 2002/0164509 A1 | 11/2002 | Wheat et al. | 429/22 |
| 2004/0099140 A1 | 5/2004 | Hesse et al. | 96/8 |

FOREIGN PATENT DOCUMENTS

| | | |
|---|---|---|
| DE | 100 59 910 | 6/2002 |
| DE | 102 19 626 | 11/2002 |

* cited by examiner ered by the fact that the bypass line is integrated in the humidifier device itself, the bypass line can be realized in the form of a chamber region of the humidifier device which is not provided with a membrane.

DEVICE AND METHOD FOR HUMIDIFYING A GAS FLOW

The invention relates to a device for humidifying at least one gas stream, in particular a gas stream flowing to a fuel cell system.

BACKGROUND

In principle, the prior art discloses two different types of PEM fuel cell systems (PEM=polymer electrolyte membrane). In this context, a distinction is drawn between fuel cell systems having a gas generation device and fuel cell systems which are operated directly with hydrogen. In the case of fuel cell systems with a gas generation device, a hydrogen-containing gas is generated in the gas generation device in order to operate the fuel cells. For this purpose, a hydrocarbon-containing compound, for example alcohol, gasoline or diesel, together with water and if appropriate air is generally converted into a hydrogen-rich gas and carbon dioxide.

In both the fuel cell systems described above, the air fed to the cathode region of the PEM fuel cell, or another oxygen-containing medium, has to be suitably humidified in order to protect the PEM from drying out. In addition, in fuel cell systems having a gas generation device, the water balance of the fuel cell system must as far as possible be continuous, in order on the one hand to ensure that the PEM is moistened and on the other hand to provide sufficient water for operation of the gas generation device without the water having to be constantly topped up. The water, stored in particular in liquid form, is then used for hot-steam reforming or auto thermal reforming of the hydrocarbon-containing compound used to obtain hydrogen in the gas generation device.

In the PEM fuel cell itself, an anode space, to which the hydrogen or hydrogen-containing gas is fed, is separated from the cathode space, to which an oxygen-containing medium, in particular air, is fed, by the PEM, which is usually installed as part of a membrane electrode assembly (MEA). In the fuel cell, in structures which are currently customary, water is simultaneously transferred from the anode side to the cathode side of the PEM. Likewise, the product water is formed during the reaction of hydrogen and oxygen. This product water is usually discharged from the cathode space by an exhaust-gas stream.

U.S. Pat. Nos. 6,007,931 and 6,048,383 now describe corresponding processes in which the humid exhaust-gas stream from the cathode space is passed through a humidifier device which has a membrane permeable to water vapor. The water vapor contained in the exhaust-gas stream can in this way pass through the membrane and humidify a gas stream flowing in the humidifier device on the other side of the membrane. This gas stream may in particular be the air supplied in the cathode space.

In this method, a dew point which is substantially dependent on the temperature of the cathode exhaust gas, the transfer capacity of the membrane and the load point of the fuel cell system is established in the gas stream that is to be humidified and is flowing to the cathode space. However, at a relatively high membrane transfer capacity, such high dew points may be established in the gas stream that is to be humidified and is fed to the cathode space that reliable operation of the fuel cell is no longer ensured. Instead of useful humidification, the result in practice is "flogging" of the PEM or the electrodes/catalysts arranged in the region thereof and/ or of the cathode space, and the electric power of the fuel cell therefore drops.

SUMMARY OF THE INVENTION

An object of the present invention is to provide a simple apparatus of compact design and a method for humidifying at least one gas stream, in particular a gas stream flowing to a fuel cell system, in which it is possible to vary the dew point in the at least one gas stream that is to be humidified, and in particular to set it to a predetermined value.

The present invention provides an apparatus for humidifying a gas stream that includes: a humidifier device including at least one membrane permeable to water vapor, wherein the gas stream and a humid gas stream flow through a humidifier device, the a gas stream and the humid gas stream being separated from one another by the at least one membrane; and at least one bypass line configured to route at least part of one of the gas stream and the humid gas stream so that it does not come into contact with the membrane.

Furthermore, the present invention provides a method for humidifying a gas stream. The method includes: flowing the gas stream through a humidifier having a membrane permeable to water vapor; flowing a humid gas stream through the humidifier, the gas stream and the humid gas stream being separated by the membrane; routing at least a portion of one of the gas stream and the humid gas stream using a bypass line so that it does not come into contact with the membrane; and varying a quantity of the portion so as to set a predetermined dew point in the gas stream.

The at least one bypass line can be used to influence the volumetric flow on at least one side of the membrane that is permeable to water vapor in a particularly simple and effective way.

For example, it is possible to vary the volumetric flow which is to be humidified and takes up the water vapor. This volumetric flow can then, for example, be mixed with the part passing through the bypass line, so that the desired dew point can be set in the mixture. It is therefore possible to vary the dew point by means of a simple device, for example by means of proportional control valves or the like.

Alternatively, it is also possible for part of the humid gas to be routed around the membrane through a bypass line. It is in this way possible to alter the quantity of water vapor provided by influencing the volumetric flows likewise in a very simple way, for example by means of a valve device, with the result that it is also possible to vary the humidification of the gas stream that is to be humidified. In this way, it is also possible by very simple means to influence the dew point in the gas stream that is to be humidified and is subsequently passed, for example, to a fuel cell.

According to a particularly expedient refinement of the abovementioned invention, the humid exhaust-gas stream, after it has flowed through the humidifier device and/or the bypass line, is routed into a further humidifier device, of comparable design, in order to humidify a further gas stream. This structure ensures that all the humidity or water vapor which is present in the exhaust-gas stream is recovered and made available to the system. This has particularly beneficial effects, for example in a fuel cell system, on the water balance of this system, so that there is no need to top up the water in order for the fuel cell system to operate.

According to a further highly expedient configuration of the invention, the at least one bypass line is integrated in the humidifier device itself.

This results in a very compact, space-saving structure which is particularly advantageous in particular when the invention is used in a fuel cell system in a motor vehicle, boat or the like.

In a refinement of the invention, the apparatus according to the invention can also be used to dry a gas stream.

This merely requires the "useful gas stream" and "exhaust gas (stripping gas) stream" to be reversed. For example, a humid gas stream can be dehumidified to an extent which can be set accurately by means of a stripping gas stream which is initially dry and then downstream of the humidifier device is humid.

BRIEF DESCRIPTION OF THE DRAWINGS

Further advantageous configurations of the invention will emerge from the claims and are explained in more detail on the basis of the exemplary embodiment described below with reference to the drawings, in which:

DETAILED DESCRIPTION

The following text provides a detailed description of the invention on the basis of an apparatus for humidifying a gas stream for a fuel cell system, but the invention is not intended to be restricted to this specific application.

Figure 1:
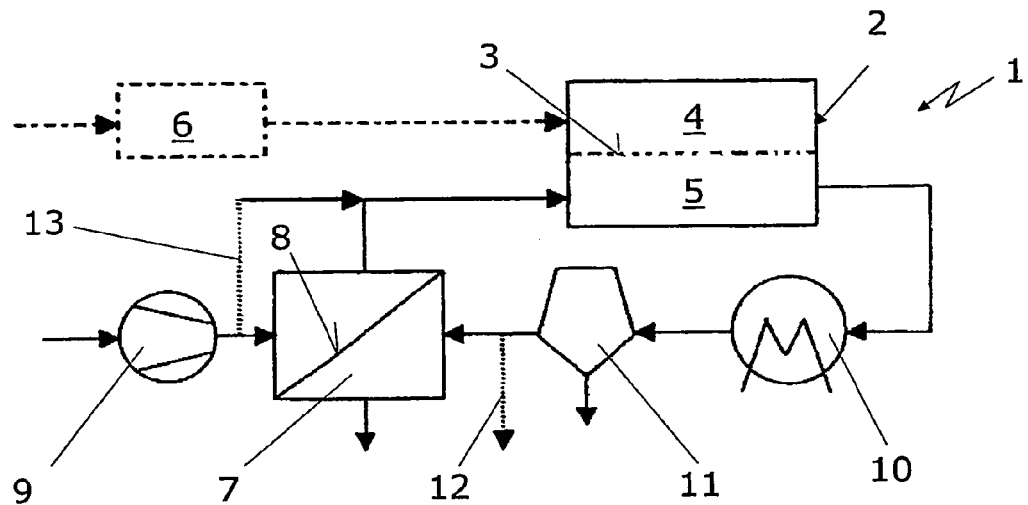
FIG. 1 shows a fuel cell system in an embodiment according to the invention.

FIG. 1 illustrates a fuel cell system 1. The fuel cell system 1 has at least one fuel cell 2, which may be constructed as an individual cell or in particular as a fuel cell stack comprising a plurality of individual cells. The fuel cell 2 has a proton-conducting membrane 3, in particular a PEM, which separates an anode space 4 from a cathode space 5 of the fuel cell 2. In the fuel cell 2, electric power is generated in a manner known per se from a hydrogen-containing medium, which is fed to the anode space 4 and an oxygen-containing medium, which is fed to the cathode space 5. Neither this electric power nor the way in which the hydrogen-containing medium is generated and/or supplied is of relevance to the humidification apparatuses presented here.

By way of example, in the fuel cell system 1 illustrated here, an optional gas generation device 6 is indicated, in which a hydrogen-rich gas is generated from a compound which includes carbon and hydrogen, together with water and if appropriate an oxygen-containing medium. However, the mode of operation of the invention can in principle also be implemented in other fuel cell systems 1, for example in those which are supplied with hydrogen gas stored in a tank.

In the fuel cell system 1 illustrated here, the product water generated by the fuel cell 2 will form usually in the region of the cathode space 5. This product water is then discharged from the cathode space 5 together with an exhaust-gas stream. At the same time, however, the cathode space 5 also requires a defined moisture content or dew point during the supply of the oxygen-containing medium, in particular air, in order to prevent the membrane 3, which is designed, for example, as a polymer electrolyte membrane, from drying out.

Therefore, the exhaust-gas stream from the cathode space 5 is passed into a humidifier device 7. In this humidifier device 7 there is at least one membrane 8 which is inherently impermeable to the exhaust gas and permeable to the water vapor contained in the exhaust gas. Membranes 8 of this type are known from the prior art and may consist of various polymer materials, hollow-fiber membranes or the like. A gas stream that is to be humidified, takes up the water vapor passing through the membrane 8 and, in the exemplary embodiment illustrated here, is then fed to the cathode space 5 as humidified feed air flows on the other side of the membrane 8. A suitable delivery device 9, e.g. a compressor, is located upstream of the humidifier device 7 in order to deliver this gas stream. The exhaust-gas stream, before it passes from the region of the cathode space 5 into the humidifier device 7, is cooled by means of a heat exchanger 10, so that part of the product water can condense out. This condensed-out part of the product water of the fuel cell and a further part of the product water of the fuel cell which is entrained in liquid form by the exhaust-gas stream is separated off in liquid form between the heat exchanger 10 and the humidifier device 7 in a liquid separator 11. This water which is separated off in liquid form can then be used for other purposes, which will be dealt with in more detail in the exemplary embodiments explained below.

In a fuel cell system 1 of this type, therefore, it is ensured in a simple and effective way that at least the part of the water which is the greatest, at least approximately, in the exhaust-gas stream is recovered. In particular, a part of the water vapor which is present in the exhaust-gas stream is used for the necessary humidification of a gas stream, in particular the feed air to the cathode space 5. A drawback in this context is that the transfer of the water vapor and therefore the humidification of the gas stream that is to be humidified is fixedly predetermined by the size of the membrane 8. It is desirable to set the dew point to be realised in the gas stream that is to be humidified, which is necessary under certain load conditions in order to prevent an excessive water content in the region of the cathode space 5, since this would be detrimental to the performance of the fuel cell 2.

The fuel cell system 1 illustrated here now provides at least one of two bypass lines 12, 13, in this case indicated by dashed lines, in order to influence the dew point of the gas stream that is to be humidified. In this context, in principle each of the two bypass lines 12, 13 on its own is able to realise setting of the dew point in the gas stream that is to be humidified, by extremely simple means. Furthermore, in addition to each individual one of the bypass lines 12, 13, it is also possible to provide a combination, i.e. the presence of both bypass lines 12 and 13, in the fuel cell system 1. The functioning of the bypass lines is explained in detail below.

The bypass line 12, which has a device (not shown here) for varying the volumetric flow which flows inside it (which device can be used to set the proportion of the volumetric flow of the exhaust gas which flows through the bypass line 12) functions as follows. A part of the exhaust-gas stream which transports the water vapor passes into the bypass line 12, whereas only the remaining part passes into the humidifier device 7. This makes it possible by extremely simple means to vary the supply of water vapor in the humidifier device 7, so that the gas stream that is to be humidified can only take up the water vapor available, and in this way it is possible to set the dew point in the gas stream that is to be humidified by means of the supply of water vapor. This variant has the drawback that part of the humid exhaust gas from the fuel cell system 1 shown in FIG. 1 leaves the fuel cell system 1 unused, and therefore water also passes to the environment unused. However, this can be avoided by a structure as described below in FIG. 8.

The alternative variant (which if appropriate may also be used as an additional measure) comprising the bypass line 13 provides for only part of the gas stream that is to be humidified to flow through the humidifier device 7. Downstream of the humidifier device 7, this part can be mixed again with the gas stream which flows through the bypass line 13 and therefore remains dry. By suitable setting the volumetric ratio passing through the bypass line 13, on the one hand, and the humidifier device 7, on the other hand, it is possible to vary or set the dew point in the gas stream which in the exemplary embodiment illustrated here then enters the cathode space 5.

Figure 2:
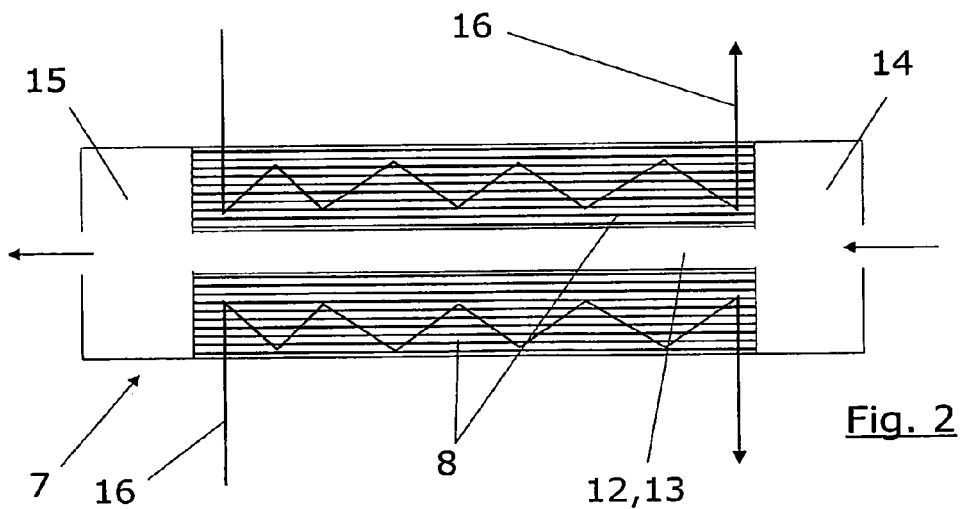
FIG. 2 shows a possible structure of a humidifier device according to the invention in the form of an outline illustration.

FIG. 2 illustrates a cross section through a specific embodiments of the humidifier device 7. A device for varying the volumetric flows passing through the region of the membrane 8, on the one hand, and the region of the bypass line 12, 13, on the other hand, is not illustrated in this figure, but a device of this type is nevertheless present.

The bypass line 12, 13 (it is of no relevance to the functioning which of the bypass lines is formed in the embodiment illustrated here) is integrated in the humidifier device 7. This is particularly expedient if the membrane 8 is designed as a bundle of hollow fibers, since the bypass line 12, 13 can then readily be integrated in the bundle as a pipeline. However, all other variants of membranes 8 are also conceivable. It is also possible for the geometric shape of the humidifier device 7 and/or of the bypass line 12, 13 to be varied in virtually any desired way.

One of the gas streams then flows from the entry region 14 of the humidifier device 7 to the exit region 15 thereof. The other flows through further line elements 16, which are only indicated here, into the region of the membranes 8. If a higher flow pressure loss is assumed for the gas stream flowing from the entry region 14 to the exit region 15 in the region of the membrane 8 than in the region of the bypass line 12, 13, the gas stream will predominantly flow through the region of the bypass line 12, 13. On account of the large surface areas of the membranes 8, this is generally always the case.

Figure 3:
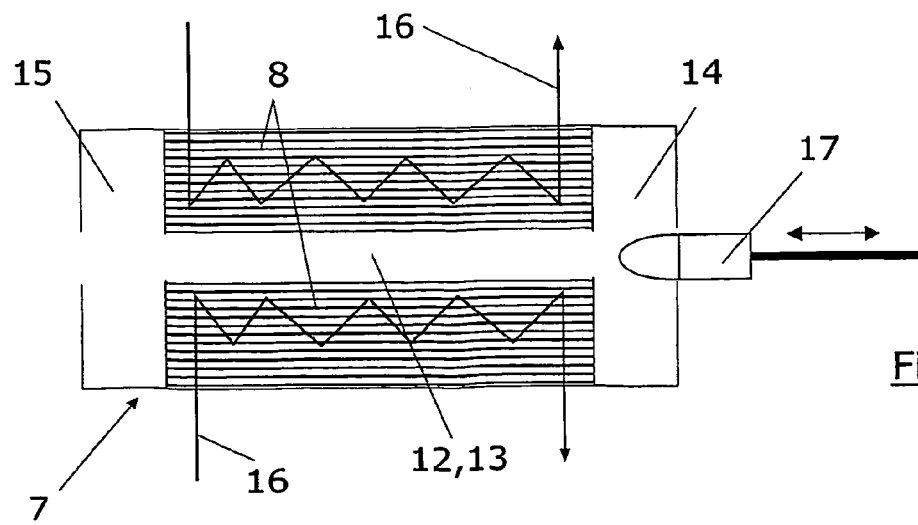
FIG. 3 shows a structure of the humidifier device shown in FIG. 2 with a device for varying the volumetric flow through a bypass line.

In order now to be able to control the volumetric flows, the cross section of the bypass line 12, 13 is altered by a device for varying the volumetric flow. In FIG. 3, this device is illustrated as a valve plunger 17. As a result of a movement in the axial direction, the remaining inflow or outflow cross section (the direction of flow is of no importance to the mode of operation) into or out of the bypass line 12, 13 can be varied continuously between "closed" and "open". The remaining part of the volumetric flow which then no longer flows through the bypass line 12, 13 then flows through the region of the membranes 8, where it is humidified or releases the water vapor which it contains.

Figure 4:
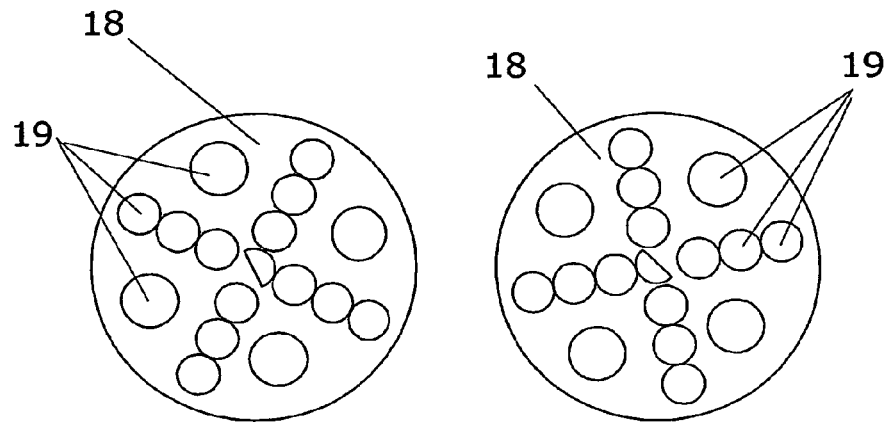
FIG. 4 shows a further possible structure of a device for varying the volumetric flow through the bypass line.

FIG. 4 illustrates the device in a further alternative embodiment. This is suitable for a round or tubular design of the humidifier device 7. The two disks 18 illustrated, with their openings 19, are arranged concentrically one immediately behind the other in the direction of flow in the entry or exit region 14, 15. If they are then rotated with respect to one another, the different degrees of overlap between the openings 19 result in different regions of the membranes 8 and/or of the bypass line 12, 13 being opened up for medium to flow through them.

Figure 5:
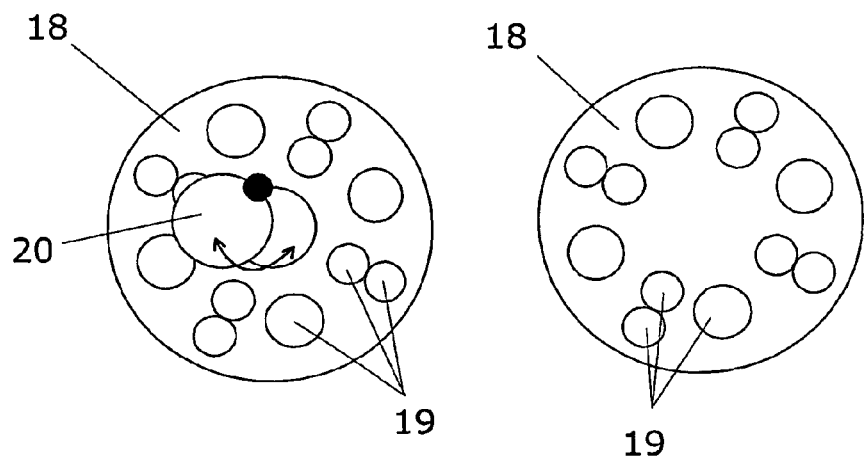
FIG. 5 shows a further alternative structure of a device for varying the volumetric flow through the bypass line.

FIG. 5 illustrates a further possible form of a device, in which the cross section through which medium can flow is varied by means of a diaphragm disk 20, which is secured eccentrically to the disk 18 and can be moved into the region of the cross section through which medium can flow. In this case, it is once again possible to use a second disk in accordance with FIG. 4 to vary the cross section through which medium can flow in the region of the membranes 8.

In addition to these devices for varying the cross section through which medium can flow which are illustrated here, it is also possible to use all further variants, combinations of conceivable and suitable devices, in particular diaphragms and the like, which can be varied axially and/or in terms of their diameter. The particular advantage of the compact design results with all embodiments which are designed in such a way that they can be integrated in the entry or exit region.

Figure 6:
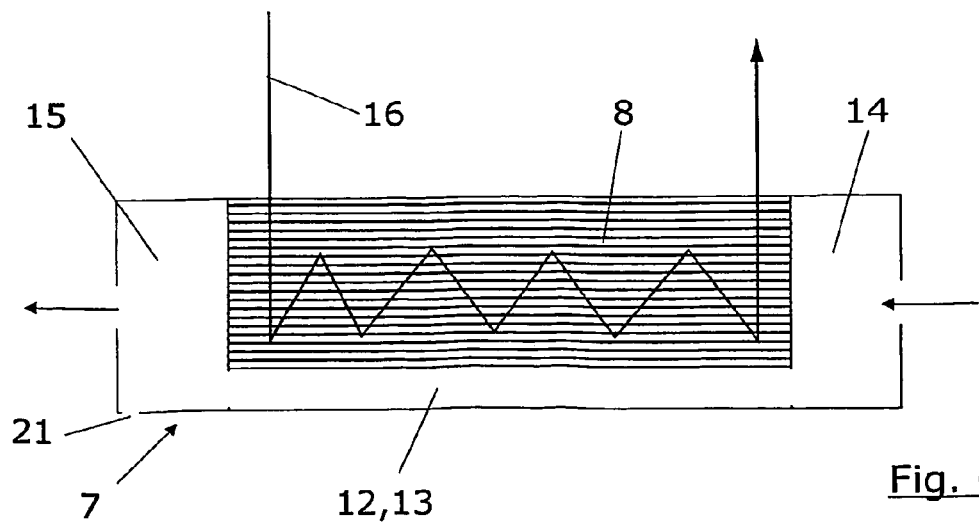
FIG. 6 shows a further possible structure of a humidifier device according to the invention in the form of an outline illustration.

FIG. 6 illustrates a further exemplary embodiment of the humidifier device 7. As a modification to the exemplary embodiment illustrated in FIG. 2, the bypass line 12, 13 is in this case arranged eccentrically. If the bypass line 12, 13 is then arranged downward in the direction of the force of gravity compared to the remainder of the humidifier device 7, any water which condenses out and collects in the region of the humidifier device can be passed through the bypass line 12, 13 in an ideal way. The water can then be discharged through the bypass line 12, 13 itself or through an optional outlet opening 21 and then made available again to the system, analogously to the water produced in the liquid separator 11.

Figure 7:
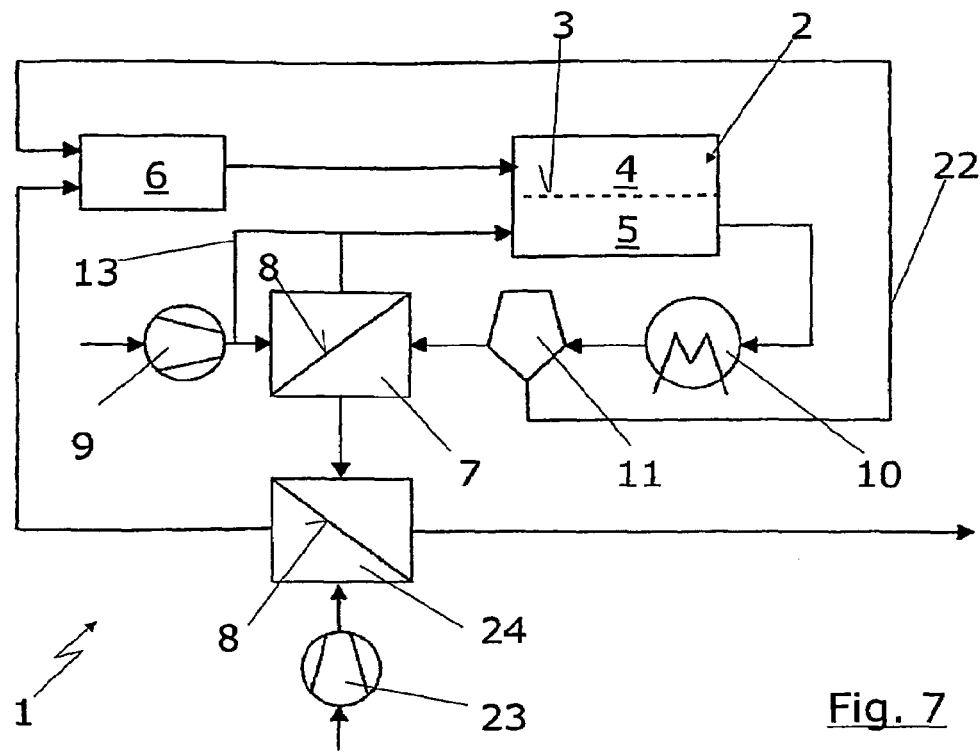
FIG. 7 shows an alternative embodiment of the fuel cell system according to the invention.

FIG. 7 shows an alternative variant of the fuel cell system 1 in which comparable components are provided with similar reference numerals to those used in FIG. 1. In the exemplary embodiment of the fuel cell system 1 illustrated here, the gas generation device 6 is a required device rather than an optional device, as in the exemplary embodiment shown above. In the case of the fuel cell system 1 in the exemplary embodiment shown in FIG. 7, only the bypass line 13 for setting the dew point in the gas stream that is to be humidified is present, this bypass line operating in accordance with the principle which has already been described above. Moreover, the water which has been separated out in liquid form in the liquid separator 11 is fed back to the gas generation device 6 via a line 21.

In the gas generation device 6, this water is reacted together with a hydrocarbon-containing compound, for example gasoline, diesel, alcohol or the like, in a manner known per se to form a hydrogen-rich gas for operating the fuel cell 2. In addition to the water, which is supplied to the gas generation device 6 via the line 22, and the hydrocarbon-containing compound, the supply of which is not illustrated here, an oxygen-containing medium is also fed to the gas generation device 6, this oxygen-containing medium being delivered to the gas generation device 6 via a delivery device 23 through a further humidifier device 24. This further humidifier device 23 is also of fundamentally similar structure to the humidifier device 7. It likewise has similar membranes 8, which are only permeable to water vapor. The moisture required to humidify the feed air to the gas generation device 6 in this case likewise originates from the exhaust-gas stream, which downstream of the humidifier device 7 still contains a certain residual moisture content, which it releases to the feed air to the gas generation system 6 in the further humidifier device 24. In this structure, with the bypass line 13 still providing the option of setting the dew point in the feed air to the cathode space 5, ideal utilization of the moisture contained in the exhaust-gas stream can be ensured. It is not necessary to vary the dew point of the feed air to the gas generation device 6, since in this case the controlled supply of liquid water can in any case subsequently be used to set the water level required for ideal reaction of the starting materials, and the level of water vapor in the humidified feed air only provides a relatively small proportion of the water required.

Figure 8:
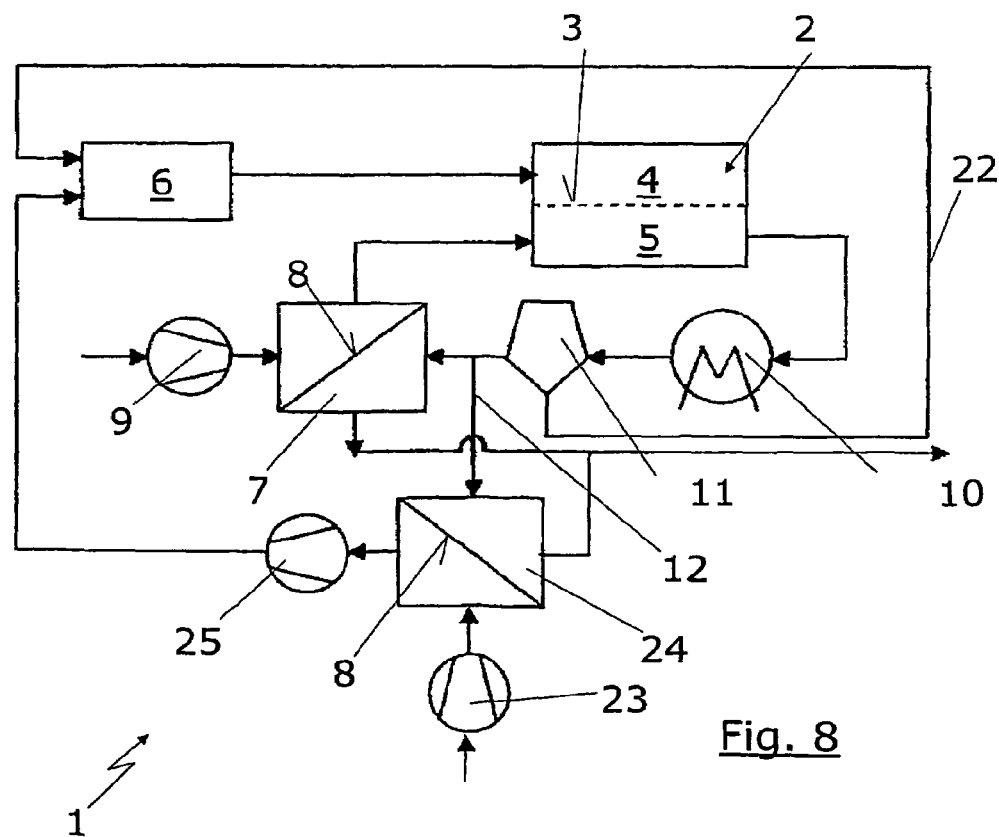
FIG. 8 shows a further alternative embodiment of the fuel cell system according to the invention.

FIG. 8 illustrates a further exemplary embodiment; in this case too, the reference numerals for functionally equivalent components have been selected to correspond to those used in the previous figures.

The fuel cell system 1 illustrated in FIG. 8 includes the variant using the bypass line 12 described above for setting the dew point in the feed air stream fed to the cathode space 5. As has already been mentioned above, this variant has the fundamental drawback that part of the humid exhaust gas flows around the humidifier device 7 and the moisture which it contains is therefore in principle lost. In the exemplary embodiment shown in FIG. 8, this drawback is avoided by the proportion of the exhaust-gas stream which flows through the bypass line 12 not being mixed directly with the exhaust-gas stream downstream of the humidifier device 7, but rather the further humidifier device 24 is arranged in between. The moisture contained in the exhaust-gas stream which flows through the bypass line 12 can therefore be transferred into the feed air for the gas generation device 6 in the further humidifier device 24, analogously to FIG. 7. In this case once again, analogously to FIG. 7, a delivery device 23 is illustrated, this device 23 being required to deliver the feed air to the gas generation device 6. The fuel cell system 1 shown in FIG. 8 now includes a further optional delivery device 25. This is or may be required if the pressure in the gas generation device 6 is significantly higher than in the region of the further humidifier device 24. In this case, the delivery device 23 would be designed as a low-pressure compressor and the delivery device 25 would accordingly be designed as a high-pressure compressor, in order to ensure the system pressure which may be required for the gas generation device 6.

In the exemplary embodiment illustrated here too, the part of the moisture in the exhaust-gas stream which is approximately the greatest is utilized to humidify the corresponding gas streams that are to be humidified or to provide the water required for the gas generation device 6.

Of course, in addition to the exemplary embodiments which have been illustrated separately here, it is also conceivable to use all conceivable and suitable combinations thereof, as well as their use with a gas generation device 6 or with hydrogen stored in corresponding storage devices. For all fuel cell systems 1, the water vapor which is present in the exhaust gas can ensure ideal humidification of gas streams that are to be humidified, in particular the feed air to the cathode space 5, while the dew point in this gas stream can be set as desired. Furthermore, the exemplary embodiments illustrated in FIGS. 7 and 8 show possible ways of also recovering the residual moisture remaining in the exhaust-gas stream, for example for operating the gas generation device 6, if present.

On account of the particularly compact and robust structure, the humidification apparatus is particularly suitable for humidification in particular for fuel cell systems 1 in land, water and air vehicles, and in this context both for fuel cell systems 1 which provide energy for driving purposes and in particular also for fuel cell systems 1 used as auxiliary power units (APUs).

The invention claimed is:

1. An apparatus for humidifying a gas stream, comprising:
a humidifier device including at least one membrane permeable to water vapor, wherein the gas stream and a humid gas stream flow through a humidifier device, the gas stream and the humid gas stream being separated from one another by the at least one membrane; and
at least one bypass line configured to route at least part of one of the gas stream and the humid gas stream so that it does not come into contact with the membrane;
a device for varying a volumetric flow through the at least one bypass line integrated in the humidifier device;
wherein the gas stream is an inlet gas stream for a fuel cell system and the humid gas stream includes an exhaust gas stream from the fuel cell system;
wherein the at least one bypass line is integrated in the humidifier device;
wherein the device for varying the volumetric flow includes a valve plunger disposed at one of an inlet and an outlet opening of the bypass line, the valve plunger configured to vary a cross section of the bypass line depending on a distance to the inlet or outlet opening.

2. An apparatus for humidifying a gas stream, comprising:
a humidifier device including at least one membrane permeable to water vapor, wherein the gas stream and a humid gas stream flow through a humidifier device, the gas stream and the humid gas stream being separated from one another by the at least one membrane; and
at least one bypass line configured to route at least part of one of the gas stream and the humid gas stream so that it does not come into contact with the membrane;
a device for varying a volumetric flow through the at least one bypass line integrated in the humidifier device;
wherein the gas stream is an inlet gas stream for a fuel cell system and the humid gas stream includes an exhaust gas stream from the fuel cell system;
wherein the at least one bypass line is integrated in the humidifier device;
wherein the device for varying the volumetric flow includes a variable diaphragm that varies a cross section of the bypass line depending on a position and opening diameter of the variable diameter.

3. An apparatus for humidifying a gas stream, comprising:
a humidifier device including at least one membrane permeable to water vapor, wherein the gas stream and a humid gas stream flow through a humidifier device, the gas stream and the humid gas stream being separated from one another by the at least one membrane; and
at least one bypass line configured to route at least part of one of the gas stream and the humid gas stream so that it does not come into contact with the membrane;
a device for varying a volumetric flow through the at least one bypass line integrated in the humidifier device;
wherein the gas stream is an inlet gas stream for a fuel cell system and the humid gas stream includes an exhaust gas stream from the fuel cell system;
wherein the at least one bypass line is integrated in the humidifier device;
wherein the device for varying the volumetric flow includes of two discs rotatable relative to one another openings, the device varying a cross section of at least one of the bypass line a flow region to the membrane depending on an angle of rotation of the two disks relative to one another.

4. An apparatus for humidifying a gas stream, comprising:
a humidifier device including at least one membrane permeable to water vapor, wherein the gas stream and a humid gas stream flow through a humidifier device, the gas stream and the humid gas stream being separated from one another by the at least one membrane; and
at least one bypass line configured to route at least part of one of the gas stream and the humid gas stream so that it does not come into contact with the membrane;
a device for varying a volumetric flow through the at least one bypass line integrated in the humidifier device;
a further humidifier device disposed downstream of the device, wherein the humid gas stream is routed into the further humidifier device so as to humidify a further gas stream;
wherein the gas stream is an inlet gas stream for a fuel cell system and the humid gas stream includes an exhaust gas stream from the fuel cell system;
wherein the at least one bypass line is integrated in the humidifier device;
wherein the further gas stream is a feed air passing into a gas generation device of the fuel cell system.

* * * * *